(12) United States Patent
Lehmann

(10) Patent No.: US 8,075,412 B2
(45) Date of Patent: Dec. 13, 2011

(54) DISPLACEMENT UNIT

(75) Inventor: Martin Lehmann, Hornberg (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 295 days.

(21) Appl. No.: 12/488,231

(22) Filed: Jun. 19, 2009

(65) Prior Publication Data

US 2010/0004065 A1   Jan. 7, 2010

Related U.S. Application Data

(60) Provisional application No. 61/074,357, filed on Jun. 20, 2008.

(51) Int. Cl.
*F16C 3/03* (2006.01)

(52) U.S. Cl. ...................................... 464/167

(58) Field of Classification Search .................. 464/167; 384/49
See application file for complete search history.

(56) References Cited

U.S. PATENT DOCUMENTS

| | | | |
|---|---|---|---|
| 2,952,145 A * | 9/1960 | Thompson | 464/167 |
| 2,979,147 A | 4/1961 | Naumann | |
| 6,193,612 B1 | 2/2001 | Craig et al. | |
| 6,217,456 B1 | 4/2001 | Jacob | |
| 6,705,948 B2 * | 3/2004 | Cermak et al. | 464/167 |
| 6,902,487 B2 * | 6/2005 | Welschof | 464/167 |

FOREIGN PATENT DOCUMENTS

| | | |
|---|---|---|
| DE | 37 30 393 A1 | 3/1989 |
| DE | 199 52 245 A1 | 7/2000 |
| DE | 101 23 221 C5 | 2/2003 |
| EP | 1 566 324 A1 | 8/2005 |
| EP | 1 588 921 A | 10/2005 |
| JP | 4-203623 A * | 7/1992 |

OTHER PUBLICATIONS

International Search Report dated Sep. 3, 2009 together with Written Opinion of the International Searching Authority.

* cited by examiner

*Primary Examiner* — Gregory Binda
(74) *Attorney, Agent, or Firm* — Crowell & Moring LLP

(57) ABSTRACT

A displacement unit comprising two shaft-shaped drive components which are displaceable in one another and each have a plurality of roller body raceways facing one another with roller bodies arranged between them. To both save weight and facilitate proper positioning of the components, a profile groove is provided between two adjacent roller body raceways of at least one drive component, the profile groove having a profile depth which is smaller than the profile depth of one of the adjacent roller body raceways.

14 Claims, 5 Drawing Sheets

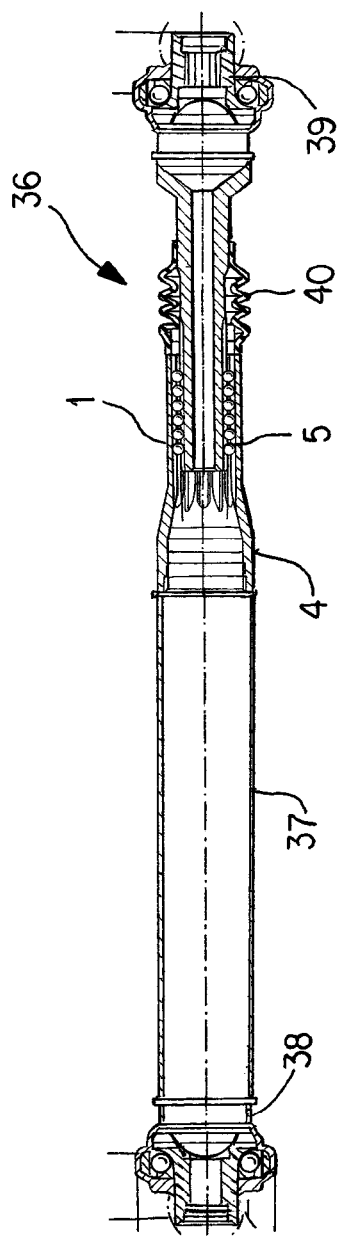
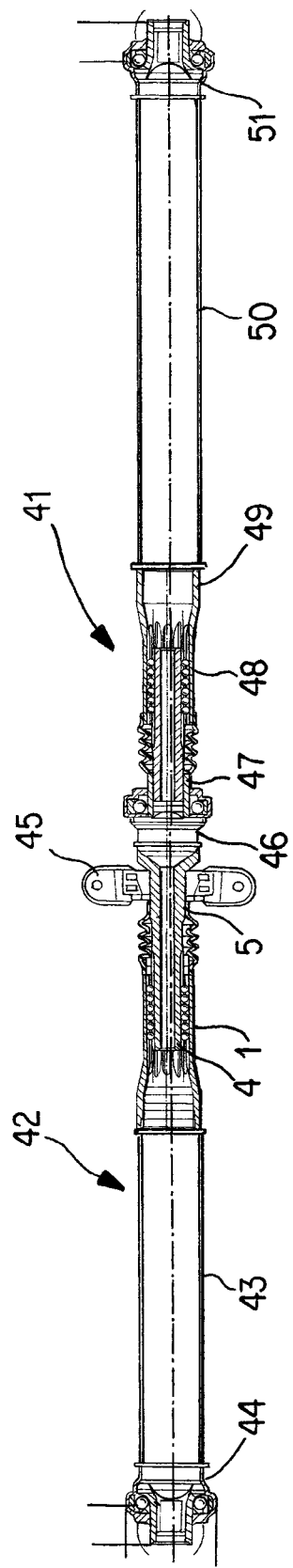
Fig. 5
Fig. 6

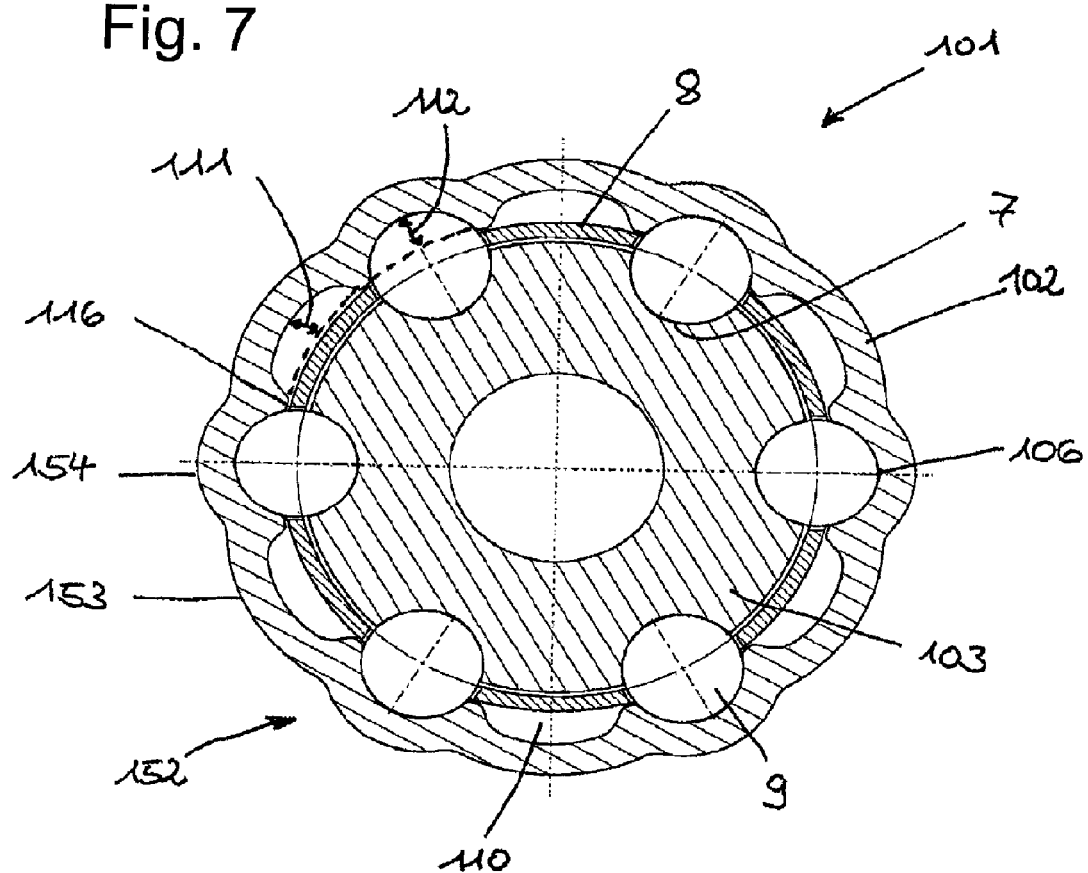

DISPLACEMENT UNIT

CROSS REFERENCE TO RELATED APPLICATIONS

This application claims priority from co-pending U.S. provisional patent application No. 61/074,357, filed Jun. 20, 2008, the entire disclosure of which is incorporated herein by reference.

BACKGROUND OF THE INVENTION

The invention relates to a displacement unit for axially limited displacement of at least two drive components mounted on one another.

Displacement units of this type are known, in particular, from drive trains of motor vehicles in which, for example, axle shafts and/or longitudinal shafts are equipped with displacement units for length adjustment between the gearbox and the chassis.

Displacement units are constructed, for example, from drive components such as a profiled sleeve and a profiled journal which is arranged therein and is axially movable to a limited extent, so that a length adjustment can be carried out by axial displacement of these parts relative to one another. The profiled sleeve and the profiled journal are ball bearing-mounted on one another. For this purpose, ball races are provided in the profiled sleeve and the profiled journal along the rotation axis of the displacement unit and arranged parallel to one another, with balls accommodated in a roller body cage axially spaced from one another and arranged over the periphery matched to the spacing of the ball races. The balls roll in the ball races and transmit the torque applied to the drive components via the shoulders of the ball races. Displacement units of this type are known, for example, from U.S. Pat. No. 6,217,456 (=DE 199 52 245) and US 2002/0169026 (=DE 101 23 221).

SUMMARY OF THE INVENTION

It is an object of the invention to provide an improved displacement unit which overcomes the aforementioned disadvantages of the prior art.

Another object of the invention is to provide a displacement unit which is particularly suitable for use in drive trains of motor vehicles.

A further object of the invention is to provide a displacement unit which achieves a reduction in weight and/or cost compared to prior designs.

An additional object of the invention is to provide a displacement unit which can be easily assembled.

It is also an object of the invention to provide a displacement unit which exhibits a high degree of functional reliability.

These and other objects have been achieved in accordance with the present invention by providing a displacement unit for axially limited displacement of at least two drive components which are ball bearing-mounted on one another, wherein one drive component can be formed from a profile sleeve with roller body raceways distributed at its inner periphery over the periphery and extending along the profile sleeve, parallel to one another, and a further drive component can be formed from a profiled journal comprising roller body raceways distributed at the outer periphery over the periphery and extending along the profiled journal parallel to one another. A plurality of axially spaced roller bodies can be accommodated in each of the roller body raceways and between at least two roller body raceways, a profile groove with a profile depth which differs from the profile depth and/or width of the roller body raceway. For particular applications, it may be advantageous if the profile groove has a smaller profile depth than the profile depth of the roller body raceways. The term "drive component" should be understood to mean the profiled sleeve and/or profiled journal, so that according to advantageous embodiments, the term "drive component" can relate respectively to the profiled sleeve, the profiled journal or both, wherein the profile groove can be made from a tool contour.

Roller bodies are generally understood to be balls, so that the roller body raceways are formed as ball races in which the balls roll essentially without play. In various preferred embodiments, the roller bodies may be barrel-shaped, needle-shaped or spherical disk-shaped, wherein the roller body raceways are arranged according to these profiles.

In the simplest case, a plurality—for example, three to twelve—preferably six or eight roller body raceways are provided distributed over the periphery of the drive components, introduced parallel to one another into the drive components, along the rotational axis thereof. A linear arrangement along the rotational axis is advantageous. For applications that are particularly demanding, it can also be provided that the roller body raceways are configured, for example, in the form of grooves with a small peripheral increment which twist relative to the rotational axis, so that on torsional loading of the displacement unit, the two drive components are at least slightly axially displaced, for example, relative to one another, wherein the displacement can be limited by one or more stops.

Advantageously, a plurality of profile grooves is introduced, seen over the periphery, between the roller body raceways. It is particularly advantageous if a profile groove is introduced between all the roller body raceways, so that profile grooves and roller body raceways continuously alternate. Profile grooves can be provided on both drive components, and the introduction of profile grooves, in particular in the profiled sleeve has proved to be advantageous.

Due, in particular, to the larger outer diameter of the profiled sleeve, the greater effort of introducing profile grooves is overcompensated by an effective weight saving. The alternating arrangement of profile grooves and roller body raceways enables a configuration to be created which corresponds, with regard to its material saving, to an arrangement of more than the required quantity of roller body raceways, so that the number of roller body raceways in the drive component concerned, for example the profiled sleeve, can be limited to the number of roller body raceways in the corresponding drive component. The design, in particular the depth of the profile groove or grooves is less than the profile depth of the roller body raceways. This means that, during assembly of the drive components onto one another, false positioning on the roller body raceways of one drive component on the profile grooves of the other drive component, which would result in a severe malfunction due to the surface of the profile groove being optimized, for example, for weight saving, is reliably avoided.

In one advantageous preferred embodiment, the drive components are distributed around the periphery in such a way that the same angular segments for profile grooves and roller body raceways can be provided. If only one drive component and/or only part of the spaces between the roller body raceways is provided with profile grooves, these angular segments can form the outer or inner periphery of the corresponding drive component or can form transitions to the adjacent roller body raceway, such as roundings or bevels. The proposed division is advantageous, in particular, for homogeneous production of the drive components and, in this case, particularly of the profiled sleeve. According to a particularly advantageous method, this is preferably produced by means of a rotary swaging method for simultaneous single-operation introduction of the roller body surfaces and the profile grooves from one raw material. The drive components are hardened following completion of their machining, preferably by case hardening.

Whereas the form of the cross-section of the roller body raceways is predetermined by the cross-section of the roller bodies, the cross-section of the profile groove or grooves can be adapted essentially freely, for example, to meet material saving requirements. The cross-section can be selected as a free-form shape or can consist of a plurality of basic geometrical forms. Cross-sections which support the shoulders of the roller body raceways which are adjacent in the peripheral direction have proved to be particularly advantageous in that the profile of the profile grooves enables a greater accumulation of material than when using a circular cross-section. To this end, one advantageous illustrative embodiment provides a trough-shaped cross-section of the profile groove or grooves. These can be formed, for example, from a circular segment forming the base of a corresponding trough, wherein the circular segment has a larger radius than, for example, the radius of a roller body raceway for ball-shaped roller bearings. Flanks adjoining the inner or outer periphery of a drive component can be attached to both ends of the circular segment. Alternatively, cross-sections of the profile grooves can be formed from two mutually spaced circular segments so that a cross-section results which has circular profiles adjacent to each of the roller body cross-sections, having an elevation in the center, depending on the overlap of the circular segments. It has proved to be advantageous if the mid-points of the circles forming the circular segments are arranged on a periphery with a larger radius than the inner periphery of the profiled sleeve or on a periphery with a smaller radius than the outer periphery of the profiled journal. The form of the elevation results from the spacing of the mid-points of the circles forming the cross-section in that their peripheries overlap or possibly only touch or even are spaced apart. At the border surface with the roller body raceway cross-sections, the circular segments can be cut to achieve a greater accumulation of material and thus provide greater strength in the shoulders of the roller body raceways.

The width of the cross-sections of the profile grooves is advantageously greater at the outer periphery of the profiled journal or at the inner periphery of the profiled sleeve than the width of the cross-section of an adjacent roller body raceway. In this way, due to the smaller depth of the profile grooves, a greater material accumulation can be achieved at the shoulder of the roller body raceway than in a roller body raceway configured as a profile groove with the same or a slightly enlarged diameter. The cross-sectional area of a profile groove of this type is larger than the cross-sectional area of the adjacent roller body raceway, so that the strength of the roller body raceways for transmitting torque in the peripheral direction and with drive components of low weight is achieved in a particularly effective manner through increased material accumulation at the shoulders of the raceways.

Particularly advantageous is the use of the proposed displacement unit in a drive shaft, particularly in the drive train of a motor vehicle as an axle shaft for driving a drive wheel and/or as a propeller shaft for driving a gearbox or a differential which distributes the drive forces to at least two drive wheels. For this purpose, suitable drive shafts can have a joint arranged at each end which compensates for a pivot angle, for example, a counter-track constant-velocity joint and at least one displacement unit as proposed, arranged therebetween. It should be understood that the shafts can be made from a plurality of, for example two, drive shafts, which are mutually connected at an attachment point fixed to a housing, wherein at least one of the drive shafts has an inventive displacement unit.

According to a further inventive concept, the problem is solved with a displacement unit for axially limited displacement of at least two drive components mounted on one another, wherein one drive component is configured sleeve-shaped and accommodates the other drive component at least partially axially within it, and the sleeve-shaped drive component has a non-round outer contour. A suitable outer contour can be formed by at least one elevation and/or recess provided on the outer periphery of the sleeve-shaped component. In a preferred manner, these radial elevations are formed by roller body raceways extending on the inner periphery of the sleeve-shaped drive component, distributed over the periphery running parallel to one another along the drive component. For example, the radial elevations may be formed by material displacement on formation of the roller body raceways during production, for example, by means of an extrusion molding or rotary swaging process.

Further, in an advantageous manner, a profile groove having a different profile depth from the roller body raceways can be introduced, seen in the peripheral direction, between at least two roller body raceways. It has proved to be advantageous if the material thickness of the drive component at the at least one elevation, for example, at its maximum radial extent, and radially outside the profile groove, for example, at its maximum radial extent, is essentially the same. It can also be advantageous if a depth of the profile groove smaller than a depth of the roller body raceways and the maxima of the profile depths are arranged essentially on the same circumference.

BRIEF DESCRIPTION OF THE DRAWINGS

The invention will now be described in greater detail with reference to illustrative embodiments illustrated in FIGS. 1 to 7, in which:

FIG. 5 is a drive shaft having the displacement unit of FIGS. 1 to 4, FIG. 6 is a drive shaft with two displacement units of FIGS. 1 to 4, and FIG. 7 shows a displacement unit similar to FIGS. 1 to 4.

DETAILED DESCRIPTION OF PREFERRED EMBODIMENTS

Figure 1:
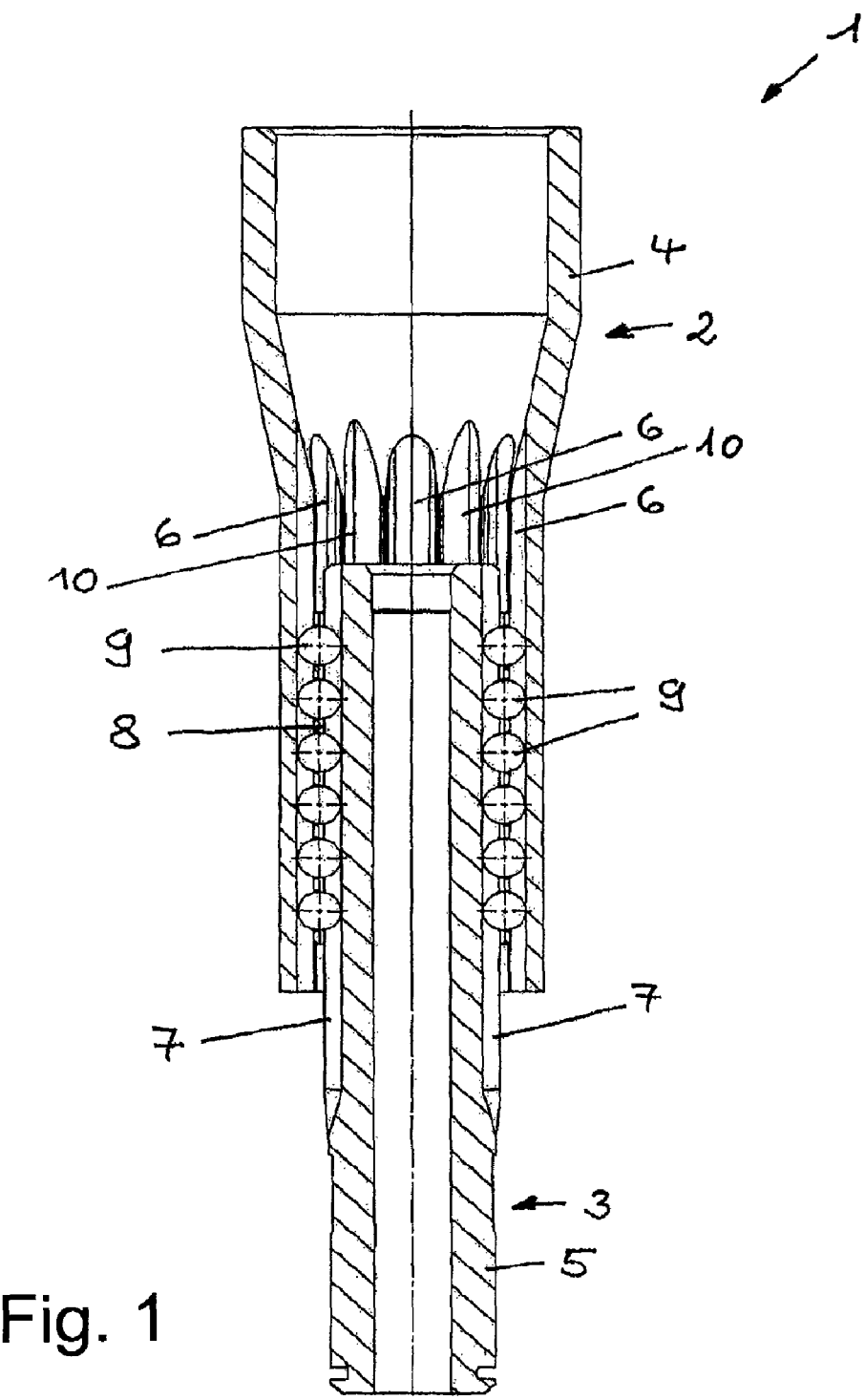
FIG. 1 is a displacement unit in longitudinal section.

FIG. 1 shows a displacement unit 1 comprising two drive components 2 and 3 which are mounted axially displaceable relative to one another. Drive component 2 comprises a profiled sleeve 4 which accommodates the drive component 3, which is configured as a profiled journal 5 which can be provided with a centered hollow bore. The profiled sleeve 4 and the profiled journal 5 have roller body raceways 6, 7 distributed over their periphery which, in their number and orientation, are complementary to one another and are formed as ball races in which mutually spaced roller bodies 9, configured as balls held in a roller body cage 8 are accommodated. Due to the roller bodies 9 being accommodated practically without play in the roller body raceways 6, 7, the roller bodies 9 roll therein during an axial displacement of the drive components 2, 3 and enable low friction displacement. Torque transmission from one drive component 2, 3 to the other also takes place via the roller bodies 9 provided between the roller body raceways 6, 7. The roller bodies 9 can also have forms other than the ball-shaped form shown, such as spherical disk, needle or barrel forms.

Profile grooves 10 are provided over the periphery, alternating with the roller body raceways 6. Roller body raceways 6 and profile grooves 10 are preferably introduced by means of a rotary swaging method or another forming process or metal-cutting process. In the illustrative embodiment shown, the profiled sleeve 4 is radially widened at its end side for form-fitting accommodation onto a further drive element, for example a connection part of a drive shaft or a joint. At the opposing side of the displacement unit 1, the profiled journal 5 has an outer profile (not shown in detail) for form-fitting accommodation on another drive element.

Figure 2:
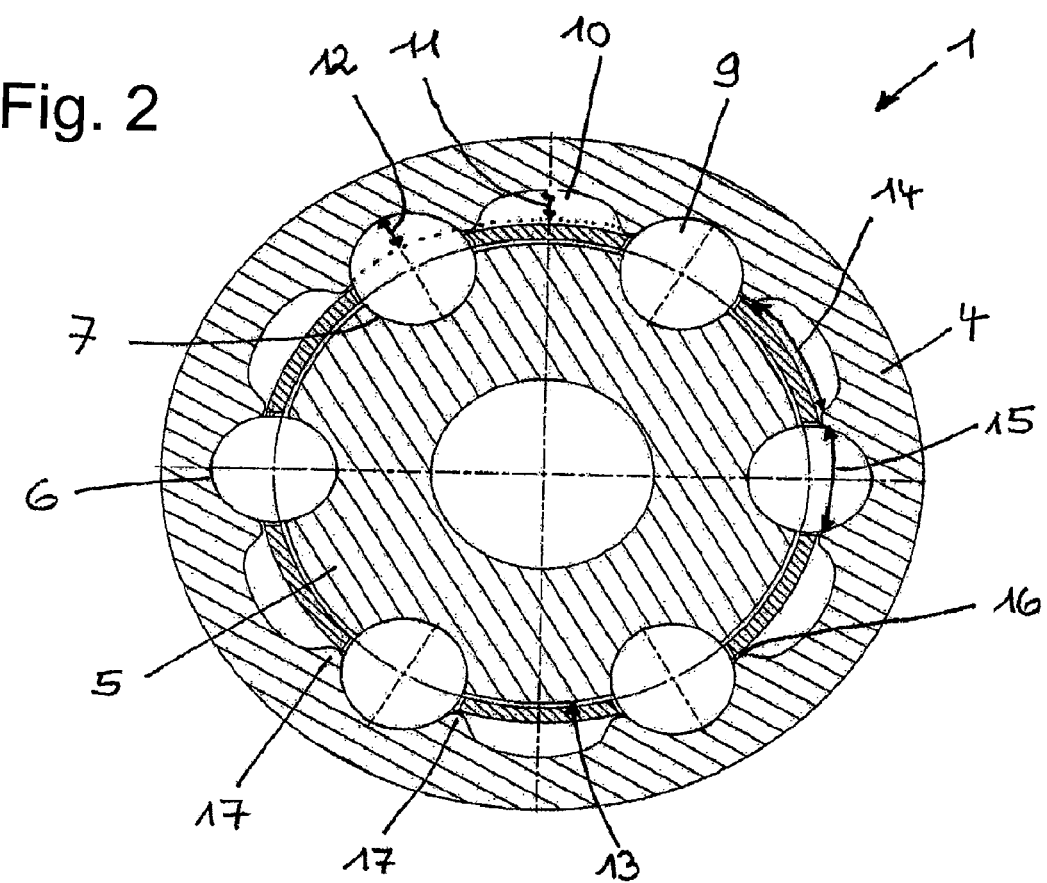
FIG. 2 is the displacement unit of FIG. 1 in cross-section.

FIG. 2 shows the displacement unit 1 of FIG. 1 in cross-section. In the illustrative embodiment shown, the same number—in this case, six—roller body raceways 6, 7, which are circular segment-shaped in cross-section, are introduced into the profiled journal 5 and the profiled sleeve 4 to accommodate the ball-shaped roller bodies 9. In the illustrative embodiment shown, the outer periphery of the profiled journal 5 has, seen over the periphery, no indentations between the roller body raceways 7. In other preferred embodiments, this may also be an outer contour, for example, in the form of one or more profile grooves distributed around the periphery and possibly alternating with the roller body raceways, said profile grooves being introduced into the profiled journal, in particular, by a tool contour using, for example, stamping or cutting methods. By contrast, the profiled sleeve 4 has profile grooves 10 around the periphery, alternating with the roller body raceways 6, the profile depth 11 of said profile grooves being smaller than the profile depth 12 of the roller body raceways 6. This makes false assembly, with the roller bodies 9 introduced into the profile grooves 10, impossible. The material thickness is also increased in the region of the greatest profile depth 11 of the profile grooves 10 and the outer periphery 13 of the profiled sleeve, and the strength of the profiled sleeve 4 is thereby increased.

The distribution of roller body raceways 6 and profile grooves 10—as shown in the illustrative embodiment—is configured with equidistant angles, so that equal angular segments are available for the roller body raceways 6 and the profile grooves 10, respectively, as in the example shown with six roller body raceways 6 and profile grooves 10, of 30° each. In other preferred embodiments, the distribution of the roller body raceways and profile grooves over the periphery can be arranged in non-equidistant angles. In order to increase the material saving in the profile grooves 10, they are configured, with regard to their width 14 in the region of the inner periphery 16 of the profiled sleeve 4, broader than the width 15 of the roller body raceways 6. The resulting trough-shaped form of the cross-section of the profile grooves 10 causes the cross-sectional area of the profile grooves 10 to be greater than the cross-sectional area of the roller body raceways 6, so that—compared with additional depressions identical to the roller body raceways or slightly radially extended depressions configured as profile grooves—several advantages ensue. For example, the material saving is greater, faulty positioning during assembly is precluded and, due to the greater material accumulation in the region of the shoulders 17 of the roller body raceways, the strength thereof increases the torque that the displacement unit 1 can transmit.

Figure 3:
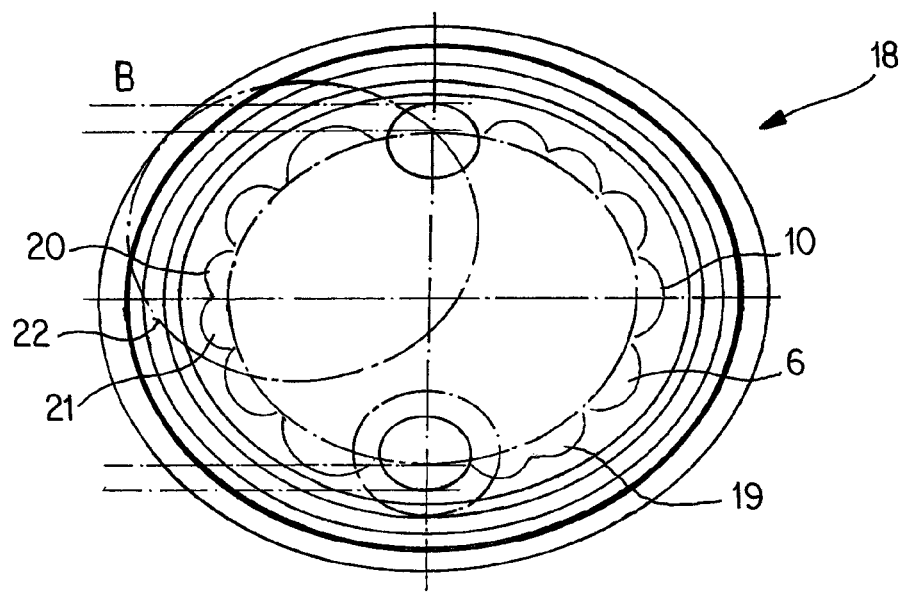
FIG. 3 is an alternative embodiment of a profiled sleeve in cross-section.

FIG. 3 shows an alternative configuration of the profiled sleeve 4 of FIGS. 1 and 2. The profiled sleeve 18 shown here in cross-section has, apart from the identical roller body raceways 6 and the profile grooves 10, an altered form of profile grooves 19, which alternate with the profile grooves 10. It should be understood that the profile grooves 10 can also be exchanged completely for the profile grooves 19. The profile grooves 19 are formed from two partial surfaces 20, 21 which are circular segment-shaped in cross-section, forming an elevation 22. To examine this in greater depth, the detail B shown in FIG. 4 will now be considered.

Figure 4:
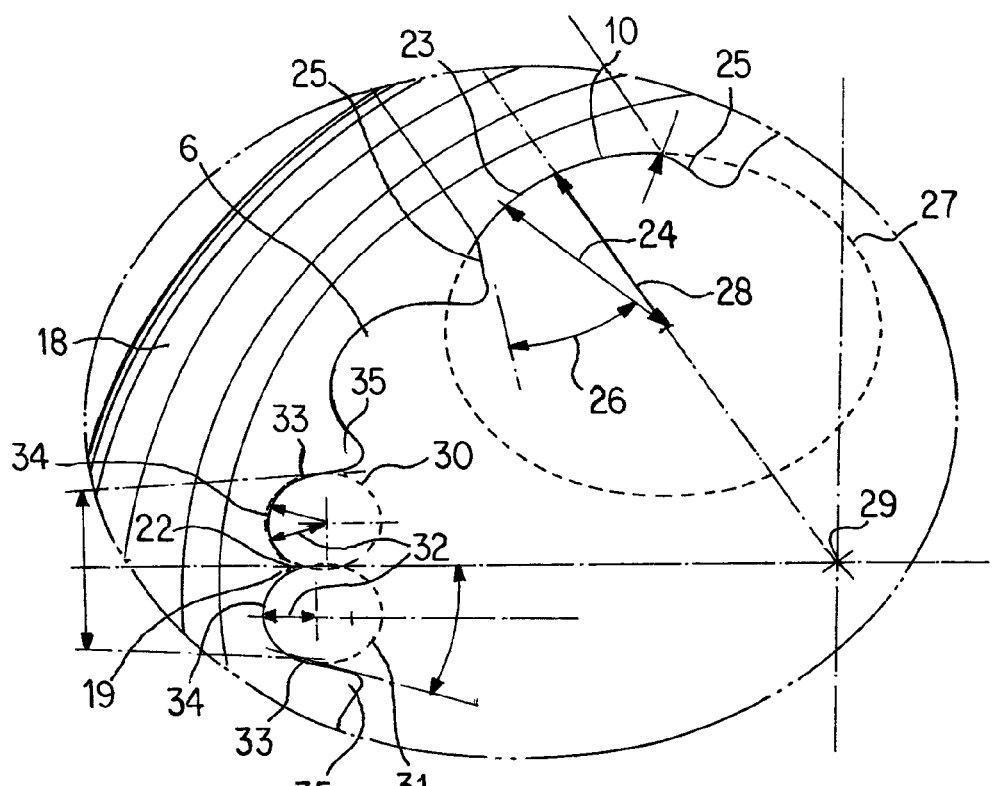
FIG. 4 is a detail of the profiled sleeve of FIG. 3.

FIG. 4 shows the detail B of FIG. 3, showing the profiled sleeve 18 with the roller body raceway 6 and respective adjacent profile grooves 10, 19. The profile groove 10 is formed from a multi-part profile of basic geometrical shapes. The base 23 is formed from a circular segment, the circle on which it is based having a radius 24 larger than the radius of the roller body 9 (FIGS. 1 and 2). The base 23 is bordered on both sides by flanks 25, which lie at the pre-defined angle 26 to the central perpendicular 28 which runs through the center of the circle 27 and, for example, between 15° and 25°, preferably 20°. The radius 24 is preferably between 2 mm and 10 mm. It may also be advantageous if the central perpendicular 28 runs not only through the central point of the circle 27, but also through the rotational axis 29 of the profiled sleeve 18.

The cross-section of the profile groove 19 is formed by two circles 30, 31 having the radius 32 and spaced apart from one another such that their circumferences touch and form the elevation 22 rising from the base of the profile groove. In the peripheral direction, the circular segments 34 formed by the circles 30, 31 are bordered by flanks 33 corresponding to the flanks 25 of the profile groove 10. The bordering of the circular segments 34 by means of the flanks 33 causes material to be accumulated in the region of the shoulders 35 of the roller body raceways 6, thereby strengthening them.

FIG. 5 shows a drive shaft 36 having the displacement unit 1 which is described in greater detail by reference to FIGS. 1 to 4. The profiled sleeve 4 is firmly connected, for example welded, to a tubular shaft part 37. At the end facing away from the displacement unit 4, the shaft part 37 carries a joint 38 for compensating for a pivot angle of the shaft part 37 relative to a drive component (not shown) which drives the joint 38. The profiled journal 5 is radially widened at one end and accommodates, for example, the joint outer part of another joint 39 intended to compensate for a pivot angle. Provided between the profiled sleeve 4 and the profiled journal 5 is a bellows 40 in order to protect the bearing of the displacement unit.

FIG. 6 shows a two-part drive shaft 41, for example, a longitudinal shaft having a first shaft part 42 comprising a first displacement unit 1, the profiled sleeve 4 of which is firmly connected to a tubular part 43 which itself comprises a joint 44, and the profiled journal 5 of which is mounted, rotatable and pivotable to a limited extent, on a holder 45 fixed to the housing, and comprises a joint 46, which is accommodated in a rotationally fixed manner on the profiled journal 47 of the second displacement unit 48. The profiled sleeve 49 is connected to a tubular part 50 which, in turn, has a joint 51 at its other end. It should be understood that one or both displacement units 1, 48 are respectively connected to the tubular parts 43, 50 or the joint 46 by swapping the profiled sleeve 4, 48 and the profiled journal 5, 49. The joints 38, 39 of FIG. 5 and the joints 44, 46, 51 can be configured as counter-track constant-velocity joints.

FIG. 7 shows a displacement unit 101 which is similar to the displacement unit 1 of FIGS. 1 to 4 and can be used in a similar manner in the shafts of FIGS. 5 and 6. In contrast to the displacement unit 1 of FIGS. 1 to 4, however, in this further embodiment the displacement unit 101 can be configured without the profile grooves 10, 19.

The displacement unit 101 is formed from a sleeve-shaped drive component 102 and a drive component 103 which is axially displaceable therein by means of the roller bodies 9 and is firmly mounted in the peripheral direction. Introduced into the drive components 102, 103 in order to accommodate the roller bodies 9 is a plurality of roller body raceways 7, 106 which are distributed over the periphery of said drive components 102, 103, said roller body raceways accommodating a plurality of roller bodies 9 which are mutually spaced axially by the roller body cage 8.

The outer periphery of the sleeve-shaped drive part 102 has an outer contour 152 which is formed by at least one elevation 154 extending radially relative to the outer periphery 153 of the drive component 102, and advantageously extends in the axial direction of the drive component 102. In the illustrative embodiment shown, the radial elevations 154 distributed around the periphery are formed so that they are arranged, seen over the periphery, radially outside the roller body raceways 106. In an advantageous manner, the radial elevations 154 are formed by a molding process wherein, in order to save material, the roller body raceways 106 are formed by material displacement radially outwardly, resulting in the elevations 154.

The illustrative embodiment shown in FIG. 7 is a further variant with profile grooves 110 introduced into the inner periphery 116 of the drive component 102, said profile grooves alternating, seen in the peripheral direction, with the roller body raceways 106 and having a smaller profile depth 111 than the profile depth 112 of the roller body raceways. In a particularly advantageous manner, the maxima of the profile depths 111, 112 can thereby be arranged over essentially the same circumference or diameter without this leading to a further radial bulging of the outer periphery 153 of the drive component 102, and thus a particularly stable and weight-saving variant of a displacement unit 101 can be provided. Particularly advantageous is an essentially even material thickness at the radially outer regions of the profile grooves 110 and roller body raceways 106, which can lead, especially in a subsequent hardening process, to particularly advantageous results.

The claims submitted with the application are suggested formulations without prejudice to the achievement of further-reaching patent protection. The applicant reserves the right to claim further combinations of features previously only disclosed in the description and/or drawings. Since the subject matter of the subclaims can form separate and independent inventions, applicant also reserves the right to make them the subject matter of independent claims or divisional applications. They may also contain self-sufficient inventions which have a form independent of the subject matter of the parent claims.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A displacement unit for axially limited displacement of at least two drive components mounted on one another, wherein:
one drive component is formed with roller body raceways distributed at its inner periphery over the periphery and extending along the drive component parallel to one another,
a further drive component is formed with roller body raceways distributed at the outer periphery over the periphery and extending along the drive component parallel to one another,
a plurality of axially spaced roller bodies is accommodated in each of the roller body raceways,
a profile groove with a profile depth different from the profile depth of the roller body raceways is formed between at least two roller body raceways, and
the profile groove has a cross-section formed from two mutually spaced circular segments.

2. The displacement unit as claimed in claim 1, wherein the profile groove has a smaller profile depth than the roller body raceways.

3. The displacement unit as claimed in claim 1, wherein one drive component is configured with a profiled sleeve and a further drive component is configured with a profiled journal.

4. The displacement unit as claimed in claim 3, wherein the number of roller body raceways in the profiled sleeve and the profiled journal is identical.

5. The displacement unit as claimed in claim 1, wherein the profile grooves and roller body raceways alternate around the periphery of a drive component.

6. The displacement unit as claimed in claim 5, wherein the distribution of profile grooves and roller body raceways is identical over the periphery.

7. The displacement unit as claimed in claim 1, wherein the profile groove of at least one drive component is produced by rotary swaging.

8. The displacement unit as claimed in claim 1, wherein the profile groove of at least one drive component is produced by extrusion.

9. The displacement unit as claimed in claim 1, wherein the profile groove of at least one drive component is made by machining.

10. The displacement unit as claimed in claim 1, wherein the mid-points of the circles forming the circular segments are arranged on a circumference with a larger radius than the inner periphery of the profiled sleeve or on a circumference of smaller radius than the outer periphery of the profiled journal.

11. The displacement unit as claimed in claim 1, wherein the circumferences of the circles forming the circular segments intersect or touch one another.

12. The displacement unit as claimed in claim 1, wherein the roller body raceways have a cross-sectional width at either the inner periphery or the outer periphery of the respective drive component which is smaller than the cross-sectional width of an adjacent profile groove.

13. The displacement unit as claimed in claim 1, wherein the profile groove has a cross-sectional area which is larger than the cross-sectional area of the adjacent roller body raceway.

14. A displacement unit for axially limited displacement of at least two drive components mounted on one another, wherein:
one drive component has a sleeve-shaped configuration and accommodates the other drive component at least partially axially within itself,
sleeve-shaped drive component has a non-circular outer contour, the outer contour is formed by at least one elevation on the outer periphery which is raised radially relative to the remainder of the outer periphery, the sleeve-shaped drive component comprises roller body raceways on its inner periphery distributed around the periphery and extending along the drive component parallel to one another, the at least one radial elevation adjoins the outer periphery of said sleeve-shaped drive component, as viewed in the peripheral direction, a profile groove having a different profile depth from the profile depth of the roller body raceways is formed between at least two roller body raceways, and the drive component has a material thickness at the at least one elevation which is substantially equal to the material thickness radially outside the profile groove.

* * * * *